US012713304B2

(12) United States Patent
Gummadi et al.

(10) Patent No.: US 12,713,304 B2
(45) Date of Patent: Aug. 18, 2026

(54) HANDOVER ASSOCIATED WITH REDUCED CAPABILITY CELLS

(71) Applicant: QUALCOMM Incorporated, San Diego, CA (US)

(72) Inventors: Bapineedu Chowdary Gummadi, Hyderabad (IN); Sravan Kumar Gullapally, Hyderabad (IN); Santosh Kumar Kancherla, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 750 days.

(21) Appl. No.: 18/148,216

(22) Filed: Dec. 29, 2022

(65) Prior Publication Data

US 2024/0224132 A1 Jul. 4, 2024

(51) Int. Cl.
*H04W 36/00* (2009.01)
*H04W 36/08* (2009.01)
*H04W 36/30* (2009.01)

(52) U.S. Cl.
CPC ....... *H04W 36/0061* (2013.01); *H04W 36/08* (2013.01); *H04W 36/305* (2018.08)

(58) Field of Classification Search
CPC ............. H04W 48/12; H04W 36/0061; H04W 36/008357; H04W 36/08; H04W 36/305; H04W 36/0079; H04W 36/083; H04W 36/085; H04W 36/087; H04W 36/13
See application file for complete search history.

(56) References Cited

U.S. PATENT DOCUMENTS

2022/0361059 A1 11/2022 He et al.
2024/0064588 A1* 2/2024 Sogabe ............. H04W 36/0083

FOREIGN PATENT DOCUMENTS

WO WO-2022230701 A1 * 11/2022 .............. H04W 8/22
WO WO-2022257074 A1 * 12/2022 ............ H04W 48/10
WO 2023007750 A1 2/2023

OTHER PUBLICATIONS

WO2022230701A1-English Translated (Year: 2025).*
WO2022257074A1-English Translated (Year: 2025).*

(Continued)

*Primary Examiner* — Ji-Hae Yea
(74) *Attorney, Agent, or Firm* — Harrity & Harrity, LLP

(57) ABSTRACT

Various aspects of the present disclosure generally relate to wireless communication. In some aspects, a reduced capability (RedCap) may receive a blind handover initiation communication comprising a cell identifier (ID) associated with a target cell. The RedCap may perform a wireless communication operation associated with the target cell based on whether the cell ID is indicated in a first database, of the first database and a second database stored in a memory of the RedCap UE, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications. Numerous other aspects are described.

30 Claims, 11 Drawing Sheets

(56) References Cited

OTHER PUBLICATIONS

International Search Report and Written Opinion—PCT/US2023/079056—ISA/EPO—Feb. 29, 2024.

Qualcomm Incorporated: "Access and Camping Restriction for RedCap UEs", 3GPP TSG-RAN WG2 Meeting #114-e, R2-2104775, 3rd Generation Partnership Project (3GPP), Mobile Competence Centre, 650, Route Des Lucioles, F-06921 Sophia-Antipolis Cedex, France, vol. RAN WG2, No. Online, May 19, 2021-May 27, 2021, May 11, 2021, XP052006537, pp. 1-6, Section 2.3 Handover and Cell Reselection Section Conclusion.

* cited by examiner

HANDOVER ASSOCIATED WITH REDUCED CAPABILITY CELLS

FIELD OF THE DISCLOSURE

Aspects of the present disclosure generally relate to wireless communication and to techniques and apparatuses for handover associated with reduced capability cells.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a reduced capability (RedCap) user equipment (UE) for wireless communication. The RedCap UE may include memory, one or more processors coupled to the memory, and instructions stored in the memory and executable by the one or more processors (e.g., directly, indirectly, after pre-processing, without pre-processing). The instructions may be executable by the one or more processors to cause the RedCap UE to receive a blind handover initiation communication indicating a frequency associated with at least one cell, the at least one cell comprising a target cell having an associated a cell identifier (ID). The instructions may be executable by the one or more processors to cause the RedCap UE to perform a wireless communication operation associated with the target cell based on whether the cell ID is indicated in a first database, of the first database and a second database stored in the memory, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications.

Some aspects described herein relate to a RedCap UE for wireless communication. The RedCap UE may include memory, one or more processors coupled to the memory, and instructions stored in the memory and executable by the one or more processors. The instructions may be executable by the one or more processors to cause the RedCap UE to receive configuration information associated with a measurement-based handover procedure. The instructions may be executable by the one or more processors to cause the RedCap UE to obtain, based on the configuration information, a measurement associated with a target cell. The instructions may be executable by the one or more processors to cause the RedCap UE to perform a wireless communication operation associated with the target cell based on the measurement satisfying a measurement condition and based on whether the cell ID is indicated in a first database, of the first database and a second database stored in the memory, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications.

Some aspects described herein relate to a method of wireless communication performed by a RedCap UE. The method may include receiving a blind handover initiation communication indicating a frequency associated with at least one cell, the at least one cell comprising a target cell having an associated cell ID. The method may include performing a wireless communication operation associated with the target cell based on whether the cell ID is indicated in a first database, of the first database and a second database stored in a memory of the RedCap UE, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications.

Some aspects described herein relate to a method of wireless communication performed by a RedCap UE. The method may include receiving configuration information associated with a measurement-based handover procedure. The method may include obtaining, based on the configuration information, a measurement associated with a target cell. The method may include performing a wireless communication operation associated with the target cell based on the measurement satisfying a measurement condition and based on whether the cell ID is indicated in a first database, of the first database and a second database stored in a memory of the RedCap UE, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications.

Some aspects described herein relate to a non-transitory computer-readable medium that stores one or more instructions for wireless communication by a RedCap UE. The one or more instructions, when executed by one or more processors of the RedCap, may cause the RedCap to receive a blind handover initiation communication indicating a frequency associated with at least one cell, the at least one cell comprising a target cell having an associated a cell ID. The one or more instructions, when executed by one or more processors of the RedCap, may cause the RedCap to perform a wireless communication operation associated with the target cell based on whether the cell ID is indicated in a first database, of the first database and a second database stored in a memory of the RedCap UE, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications.

Some aspects described herein relate to a non-transitory computer-readable medium that stores one or more instructions for wireless communication by a RedCap. The one or more instructions, when executed by one or more processors of the RedCap, may cause the RedCap to receive configuration information associated with a measurement-based handover procedure. The one or more instructions, when executed by one or more processors of the RedCap, may cause the RedCap to obtain, based on the configuration information, a measurement associated with a target cell. The one or more instructions, when executed by one or more processors of the RedCap, may cause the RedCap to perform a wireless communication operation associated with the target cell based on the measurement satisfying a measurement condition and based on whether the cell ID is indicated in a first database, of the first database and a second database stored in a memory of the RedCap UE, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications.

Some aspects described herein relate to an apparatus for wireless communication. The apparatus may include means for receiving a blind handover initiation communication indicating a frequency associated with at least one cell, the at least one cell comprising a target cell having an associated a cell ID associated with a target cell. The apparatus may include means for performing a wireless communication operation associated with the target cell based on whether the cell ID is indicated in a first database, of the first database and a second database stored in a memory of the apparatus, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications.

Some aspects described herein relate to an apparatus for wireless communication. The apparatus may include means for receiving configuration information associated with a measurement-based handover procedure. The apparatus may include means for obtaining, based on the configuration information, a measurement associated with a target cell. The apparatus may include means for performing a wireless communication operation associated with the target cell based on the measurement satisfying a measurement condition and based on whether the cell ID is indicated in a first database, of the first database and a second database stored in a memory of the apparatus, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
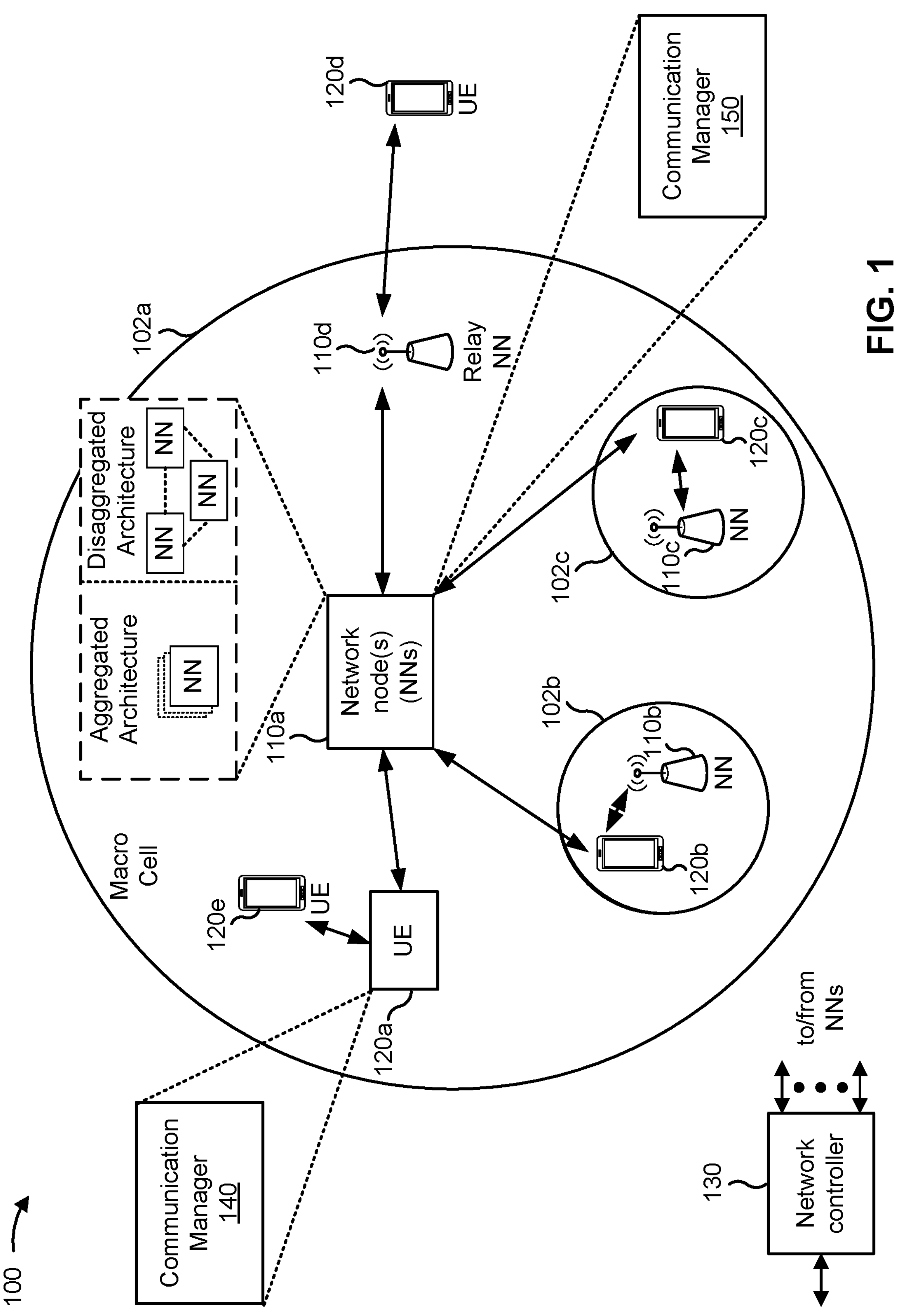
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In some aspects, UEs may be classified according to different categories and/or may support different capabilities. For example, a network node may serve a first category of UEs that have a less advanced capability (e.g., a lower capability and/or a reduced capability) and a second category of UEs that have a more advanced capability (e.g., a higher capability). A UE of the first category may have a reduced feature set compared to UEs of the second category, and may be referred to as a reduced capability (RedCap) UE (which may be interchangeably referred to as a reduced capacity UE, also having the acronym "RedCap"), a low tier UE, and/or an NR-Lite UE, among other examples. A UE of the second category may be an ultra-reliable low-latency communication (URLLC) devices and/or an enhanced mobile broadband (eMBB) device and may have an advanced feature set compared to RedCap UEs. RedCap UEs may include wearable devices, IoT devices, sensors, cameras, and/or the like that are associated with a limited bandwidth, power capacity, and/or transmission range, among other examples. A UE of the second category may be referred to as a legacy UE, a baseline UE, a high tier UE, an NR UE, and/or a premium UE, among other examples. In some aspects, a RedCap UE may have capabilities that satisfy requirements of a first wireless communication standard but not a second wireless communication standard, while a UE of the second category may have capabilities that satisfy requirements of the second wireless communication standard (and also the first wireless communication standard, in some cases).

For example, a RedCap UE of the first category may support a lower maximum modulation and coding scheme (MCS) than a UE of the second category (e.g., quadrature phase shift keying (QPSK) or the like as compared to 256-quadrature amplitude modulation (QAM) or the like), may support a lower maximum transmit power than a UE of the second category, may have a less advanced beamforming capability than a UE of the second category (e.g., may not be capable of forming as many beams as a UE of the second category), may require a longer processing time than a UE of the second category, may include less hardware than a UE of the second category (e.g., fewer antennas, fewer transmit antennas, and/or fewer receive antennas), and/or may not be capable of communicating on as wide of a maximum bandwidth part as a UE of the second category, among other examples.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a RedCap UE (e.g., the UE 120) may include a communication manager 140. As described in more detail elsewhere herein, the communication manager 140 may receive a blind handover initiation communication indicating a frequency associated with at least one cell, the at least one cell comprising a target cell having an associated a cell identifier (ID); and perform a wireless communication operation associated with the target cell based on whether the cell ID is indicated in a first database, of the first database and a second database stored in a memory of the RedCap UE, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications.

In some aspects, the communication manager 140 may receive configuration information associated with a measurement-based handover procedure; obtain, based on the configuration information, a measurement associated with a target cell; and perform a wireless communication operation associated with the target cell based on the measurement satisfying a measurement condition and based on whether the cell ID is indicated in a first database, of the first database and a second database stored in a memory of the RedCap UE, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications. Additionally, or alternatively, the communication manager 140 may perform one or more other operations described herein.

As indicated above, FIG. 1 is provided as an example. Other examples may differ from what is described with regard to FIG. 1.

Figure 2:
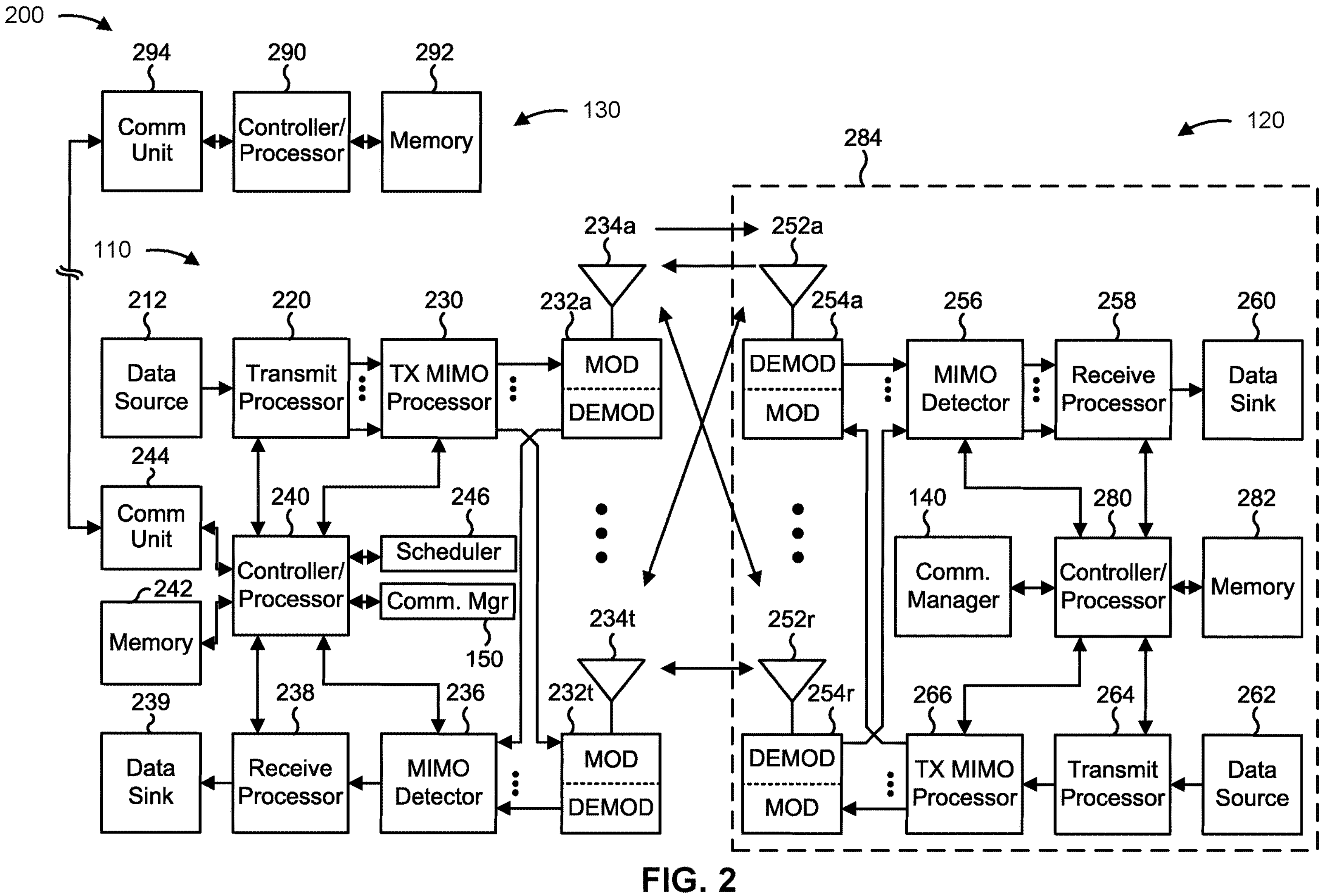
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more MCSs for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a network node, such as for millimeter wave communications and/or the like. In such a case, the network node may provide the UE with a configuration of transmission configuration indicator (TCI) states that respectively indicate beams that may be used by the UE, such as for receiving a physical downlink shared channel (PDSCH). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-co-location (QCL) type. A QCL type may indicate one or more spatial parameters to be derived from the source signal. The source signal may be referred to as a QCL source. The network node may indicate an activated TCI state to the UE, which the UE may use to select a beam for receiving the PDSCH.

A beam indication may be, or include, a TCI state information element, a beam ID, spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a QCL type (e.g., a qcl-Type1, qcl-Type2, qcl-TypeA, qcl-TypeB, qcl-TypeC, qcl-TypeD), and/or the like), a cell identification (e.g., a ServCellIndex), a bandwidth part identification (bwp-Id), a reference signal identification such as a CSI-RS (e.g., an NZP-(SI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4A-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4A-9).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, and/or any other component(s) of FIG. 2 may perform one or more techniques associated with handover associated with reduced capability cells, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a RedCap UE (e.g., the UE 120) includes means for receiving a blind handover initiation communication indicating a frequency associated with at least one cell, the at least one cell comprising a target cell having an associated a cell ID; and/or means for performing a wireless communication operation associated with the target cell based on whether the cell ID is indicated in a first database, of the first database and a second database stored in a memory of the RedCap UE, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications.

In some aspects, the RedCap UE includes means for receiving configuration information associated with a measurement-based handover procedure; means for obtaining, based on the configuration information, a measurement associated with a target cell; and/or means for performing a wireless communication operation associated with the target cell based on the measurement satisfying a measurement condition and based on whether the cell ID is indicated in a first database, of the first database and a second database stored in a memory of the RedCap UE, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications. In some aspects, the means for the reduced capability (RedCap) to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
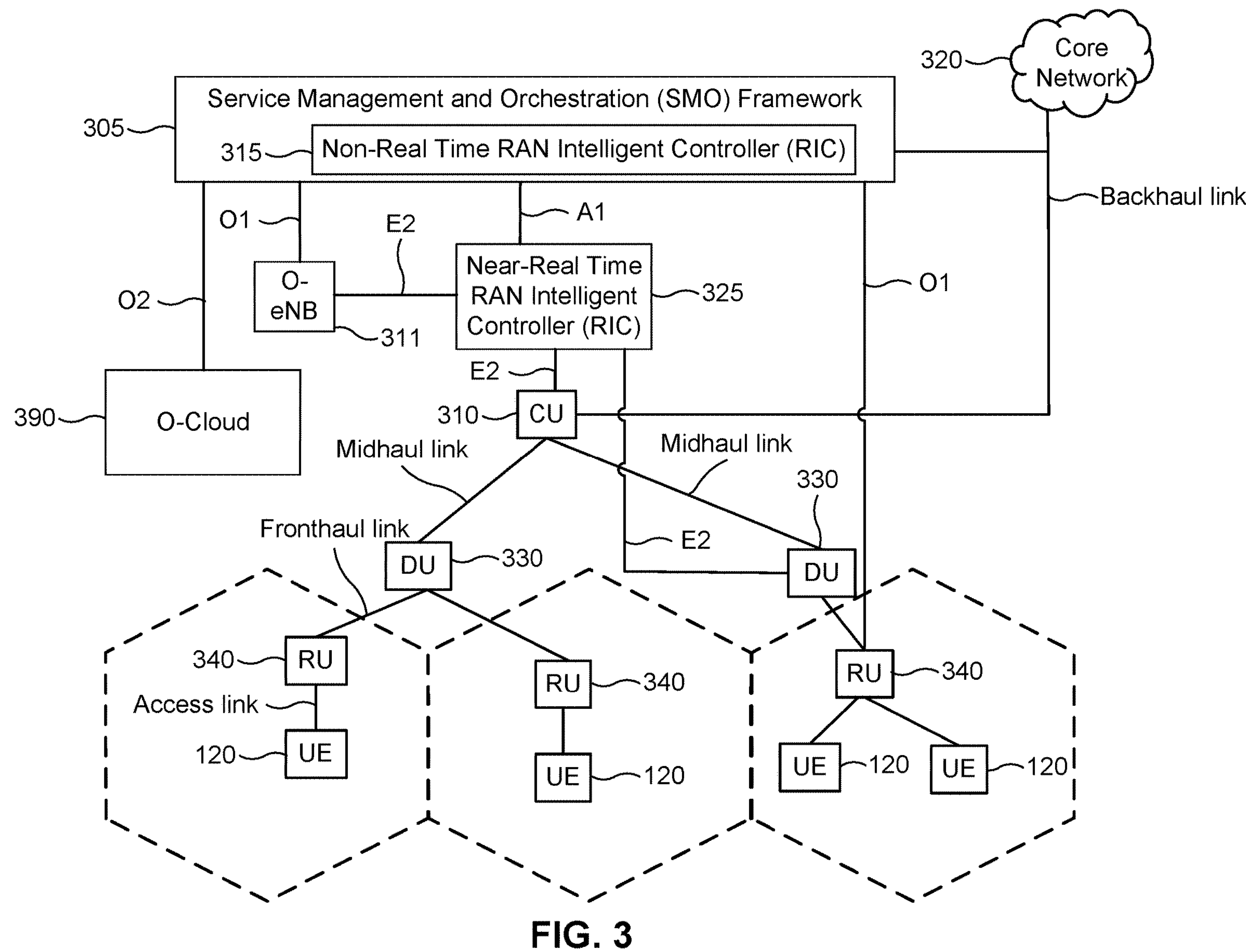
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective RF access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Some cells in a wireless network can support RedCap UEs while other cells in the wireless network may not support RedCap UEs. A cell that supports RedCap UEs may be referred to as a "RedCap cell" and a cell that does not support RedCap UEs may be referred to as a "non-RedCap cell." For example, in order for a cell to support RedCap UEs, the cell may support additional and/or reduced operations, additional and/or reduced features, and/or additional configurations associated with RedCap UEs. Therefore, some cells within the wireless network may support the additional operations, additional features, and/or additional configurations while other cells in the wireless network may not support the additional operations, additional features, and/or additional configurations. For example, a network operator may configure certain cells to support non-RedCap UEs, such as cells associated with high traffic demand, and may configure other cells to support RedCap UEs, such as cells associated with lower traffic demand (e.g., to conserve costs, overhead, and/or resources associated with configuring the cells to support reduced capability UEs). A RedCap UE may be unable to establish a connection with a cell that does not support RedCap UEs. For example, the core network and/or a base station associated with the cell may not allow a reduced UE capability (e.g., based on subscription information or mobility policy information) to establish a connection with a cell that does not support RedCap UEs. As a result, a RedCap UE may experience poor wireless coverage within the wireless network.

For example, as the RedCap UE physically moves through the wireless network, the RedCap UE may travel to areas served by cells (e.g., NR cells and/or LTE cells) that do not support RedCap UEs. As a result, the RedCap UE may be unable to establish a connection with a cell in certain areas associated with the wireless network. Thus, the RedCap UE often has to perform a full search (e.g., a search of all nearby cells) to find a RedCap cell by receiving (e.g., decoding and reading) a system information block 1 (SIB1) from each nearby cell. Performing a full search can be unnecessarily time consuming. In some cases, re-establishment can be impossible. In either case, the service interruption and power consumption can be significant, thereby resulting in poor wireless coverage, degraded performance, increased latency, inefficient operation, and/or a poor user experience, among other examples.

Some techniques and apparatuses described herein enable enhanced RedCap UE operations. For example, some aspects provide for a RedCap UE to perform a re-establishment onto a RedCap cell after triggering a radio link failure (RLF). Some aspects provide for handover from an LTE cell to an NR RedCap cell via a blind handover procedure or a measurement-based handover procedure. In some aspects, the RedCap UE may include two databases. A first database may be configured for storing RedCap-supporting cell information that includes at least one RedCap support indication associated with at least one cell that indicates that the at least one cell supports RedCap communications. The second database may be configured for storing non-RedCap-supporting cell information that includes at least one non-RedCap support indication associated with at least one additional cell that indicates that the at least one additional cell does not support RedCap communications. In some aspects, the first database and/or the second database may be, be similar to, include, or be included in, an acquisition database, configured to store indications of cells with which the RedCap UE has acquired access.

In some aspects, when the network redirects the RedCap UE to a target cell blindly, the RedCap UE may determine, based on the two databases, whether the target cell is a RedCap cell or not. If the target cell is a RedCap cell, the RedCap UE may perform a random access channel (RACH) handover procedure to reestablish coverage on the target cell and, if not, the RedCap UE may declare early RLF and search for a RedCap cell. If the target cell is not in the one of the two databases, the RedCap UE may read system information (e.g., SIB1) to determine whether the target cell is a RedCap cell. If the target cell is a RedCap cell, the RedCap UE may perform the RACH handover procedure and may add an indication associated with the target cell to the first database. If the target cell is a non-RedCap cell, the RedCap UE may search for the cells indicated in the first database and may camp on any suitable cell. If no suitable cell is found, the RedCap UE may fall back to the legacy (full) search process to perform a full search.

In aspects associated with measurement-based handover, the RedCap UE may omit, from a measurement report, measurements associated with non-RedCap cells. the cells in the measurement report which do not support RedCap UEs. When the network configures the RedCap UE to measure and report signal quality information associated with indicated frequencies, the RedCap UE may measure and detect cells in those frequencies that satisfy a measurement condition, and may provide a report indicating the measurements. The RedCap UE may determine, based on the two databases, whether the cells are RedCap cells and may omit, from the measurement report, measurements associated with non-RedCap cells. If a cell satisfying the measurement condition is not indicated in the databases and, if the cell is a best cell in a corresponding frequency (e.g., the cell in that frequency having the highest associated signal quality and/or power), the UE may read the SIB1 of the cell to determine whether the cell is a RedCap cell and, based on that determination, may determine whether to include an associated measurement in the measurement report. If the cell is not the best cell in the frequency, and is not present in the databases, the RedCap UE may include an associated measurement in the measurement report. If the network triggers handover to the cell, the RedCap UE may refrain from reading corresponding system information, thereby reducing time consumption associated with reading system.

Figure 4A:
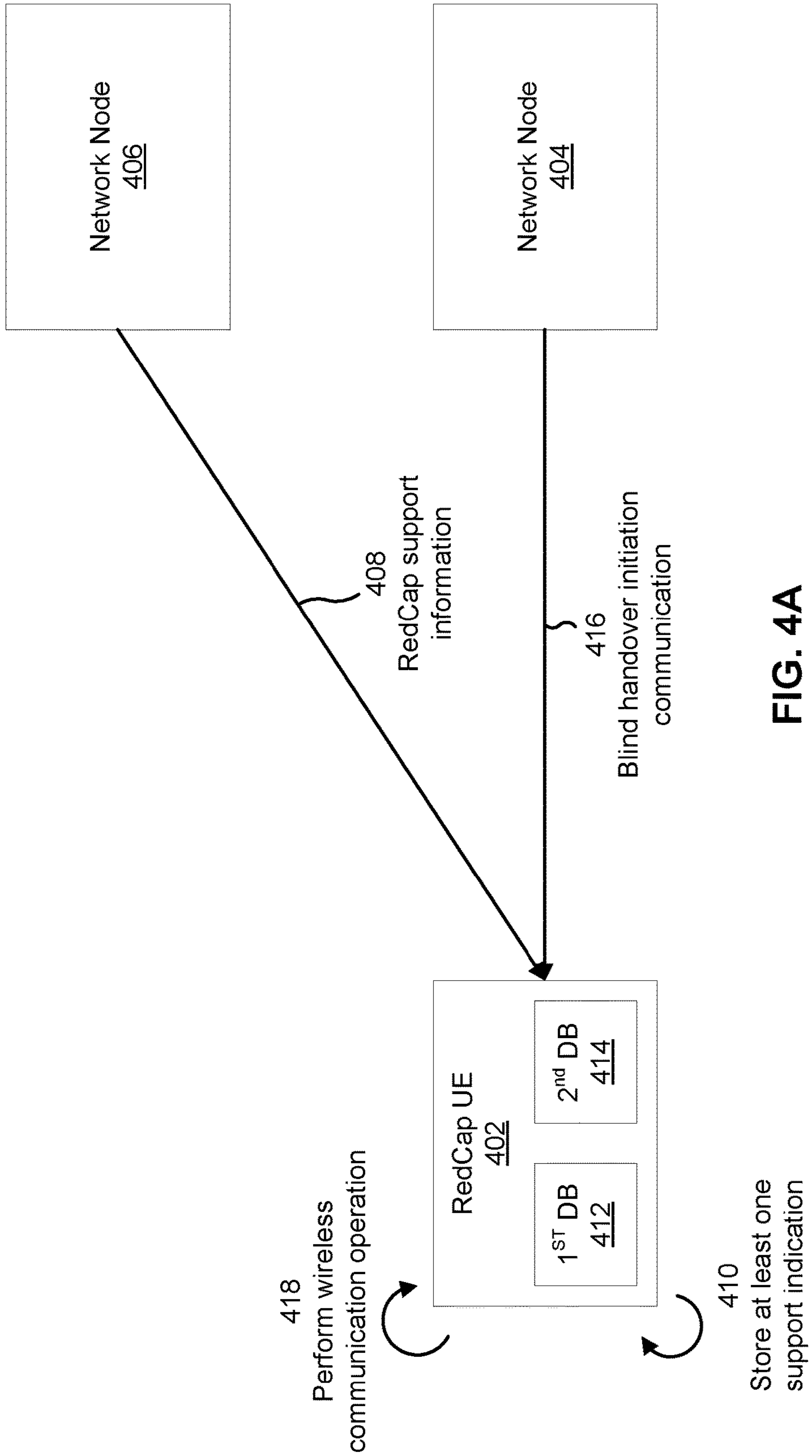
FIG. 4A is a diagram illustrating an example associated with blind handover optimization for reduced capability (RedCap) UEs, in accordance with the present disclosure.

FIG. 4A is a diagram illustrating an example 400 associated with blind handover optimization for RedCap UEs, in accordance with the present disclosure. As shown in FIG. 4A, a RedCap UE 402 may communicate with a network node 404. The network node 404 may be associated with (e.g., provide) a source cell to which the RedCap UE 402 may be connected. In some aspects, the source cell may be an LTE cell. A network node 406 may be associated with a target cell. In some aspects, the target cell may be an NR cell. In some aspects, the RedCap UE 502 may be, be similar to, include, or be included in, the UE 120 depicted in FIGS. 1-3. In some aspects, the network node 404 and/or the network node 406 may be, be similar to, include, or be included in, the network node 110 depicted in FIGS. 1 and 2 and/or one or more components of the disaggregated base station architecture 300 depicted in FIG. 3.

As shown by reference number 408, the network node 406 may transmit, and the RedCap UE 402 may receive, RedCap support information. The RedCap support information may be associated with at least one cell associated with (e.g., provided by) the network node 406 and may indicate whether the at least one cell supports RedCap communications. RedCap support information may be any information that is indicative of whether a cell supports RedCap communications. For example, in some aspects, RedCap support information may include an explicit indication that the cell supports RedCap communications and/or an implicit indication that the cell supports RedCap communications. The implicit indication may include a configuration and/or feature of the cell that is associated with support of RedCap communications. Similarly, RedCap support information may include an explicit indication that the cell does not support RedCap communications and/or an implicit indication that the cell does not support RedCap communications. The implicit indication may include a configuration and/or feature of the cell that is not associated with RedCap communications. In some aspects, the lack of an explicit indication that the cell supports RedCap communications may be RedCap support information indicating that the cell does not support RedCap communications. In some aspects, for example, the network node 406 may transmit, and the RedCap UE 402 may receive, system information (e.g., a SIB1) that includes the RedCap support information.

As shown by reference number 410, the RedCap UE 402 may store, based on the RedCap support information, at least one RedCap support indication and/or non-RedCap support indication in a first database 412 or a second database 414, respectively. The first database 412 may include at least one RedCap support indication associated with at least one cell that indicates that the at least one cell supports RedCap communications. The second database 414 may include at least one non-RedCap support indication associated with at least one additional cell that indicates that the at least one additional cell does not support RedCap communications.

As shown by reference number 416, the network node 404 may transmit, and the RedCap UE 402 may receive, a blind handover initiation communication. The blind handover initiation communication may indicate a frequency that the RedCap 402 may search to identify a best cell in that frequency. The identified cell may be referred to as a "target cell" (e.g., the target cell associated with the network node 406). Accordingly, the indicated frequency may be associated with the target cell, which may have an associated cell ID. As shown by reference number 418, the RedCap UE 402 may perform a wireless communication operation. For example, in some aspects, the RedCap UE 402 may perform a wireless communication operation associated with the target cell based on whether the cell ID is indicated in the first database 412. In some aspects, for example, performing the wireless communication operation may include initiating, based on the cell ID being indicated in the first database 412, a RACH handover procedure associated with the target cell. In some aspects, performing the wireless communication operation may include updating the first database 412 and/or the second database 414.

Figure 4B:
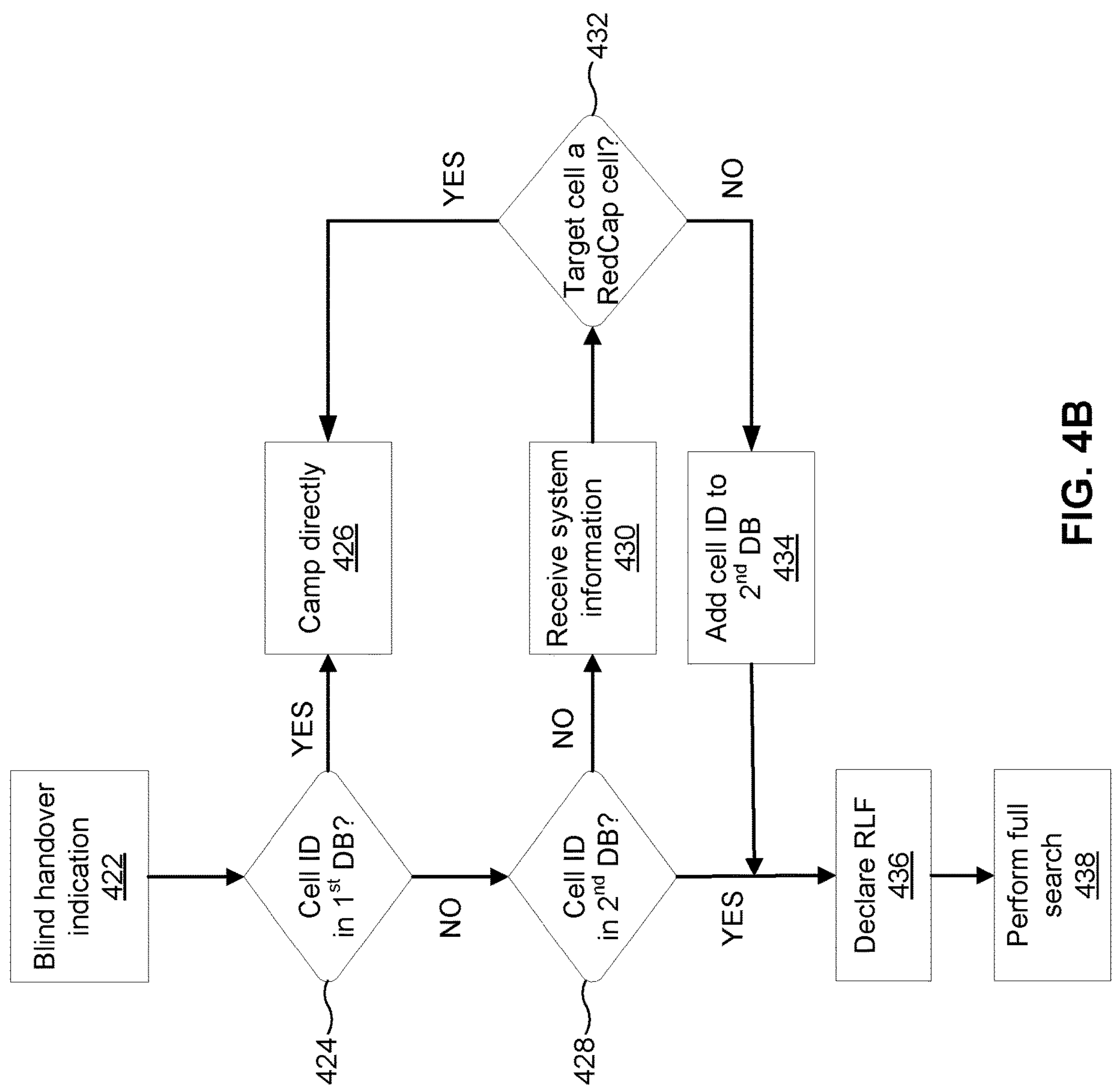
FIG. 4B is a diagram illustrating another example associated with blind handover optimization for RedCap UEs, in accordance with the present disclosure.

FIG. 4B is a diagram illustrating another example 420 associated with blind handover optimization for RedCap UEs, in accordance with the present disclosure. Example 420 depicts an example of a procedure that may be performed by the RedCap UE 402 in connection with the example 400 depicted in FIG. 4A.

As shown by reference number 422, the RedCap UE 402 may receive a blind handover indication. The blind handover indication may be associated with a target cell having an associated cell ID. As shown by reference number 424, the RedCap UE 402 may determine whether the cell ID is indicated in the first database 412. If the cell ID is indicated in the first database 412, as shown by reference number 426, the RedCap UE 402 may camp on the target cell. For example, as indicated above in connection with FIG. 4A, the RedCap UE 402 may initiate a RACH handover procedure to camp on the target cell.

If the cell ID is not indicated in the first database 412, as shown by reference number 428, the RedCap UE 402 may determine whether the cell ID is indicated in the second database 414. If the cell ID is not indicated in the second database 414, as shown by reference number 430, the RedCap UE 402 may receive system information. The system information may be associated with the target cell and may include RedCap support information associated with the target cell that indicates whether the target cell supports RedCap communications. As shown by reference number 432, the RedCap UE 402 may determine, based on the RedCap support information, whether the target cell is a RedCap cell. If the target cell is a RedCap cell, as shown by reference number 426, the RedCap UE 402 may camp on the target cell. In some aspects, the RedCap UE 402 may add an indication of the target cell to the first database 412. If the target cell is not a RedCap cell, as shown by reference number 434, the RedCap UE 402 may add the cell ID to the second database 414. If the cell ID is indicated in the second database 414, as shown by reference number 436, the RedCap UE 402 may declare RLF and, as shown by reference number 438, may perform a full search. In some aspects, for example, the RedCap UE 402 may perform a search for a RedCap cell that is indicated in the first database 412.

As indicated above, FIGS. 4A and 4B are provided as examples. Other examples may differ from what is described with respect to FIGS. 4A and 4B.

Figure 5A:
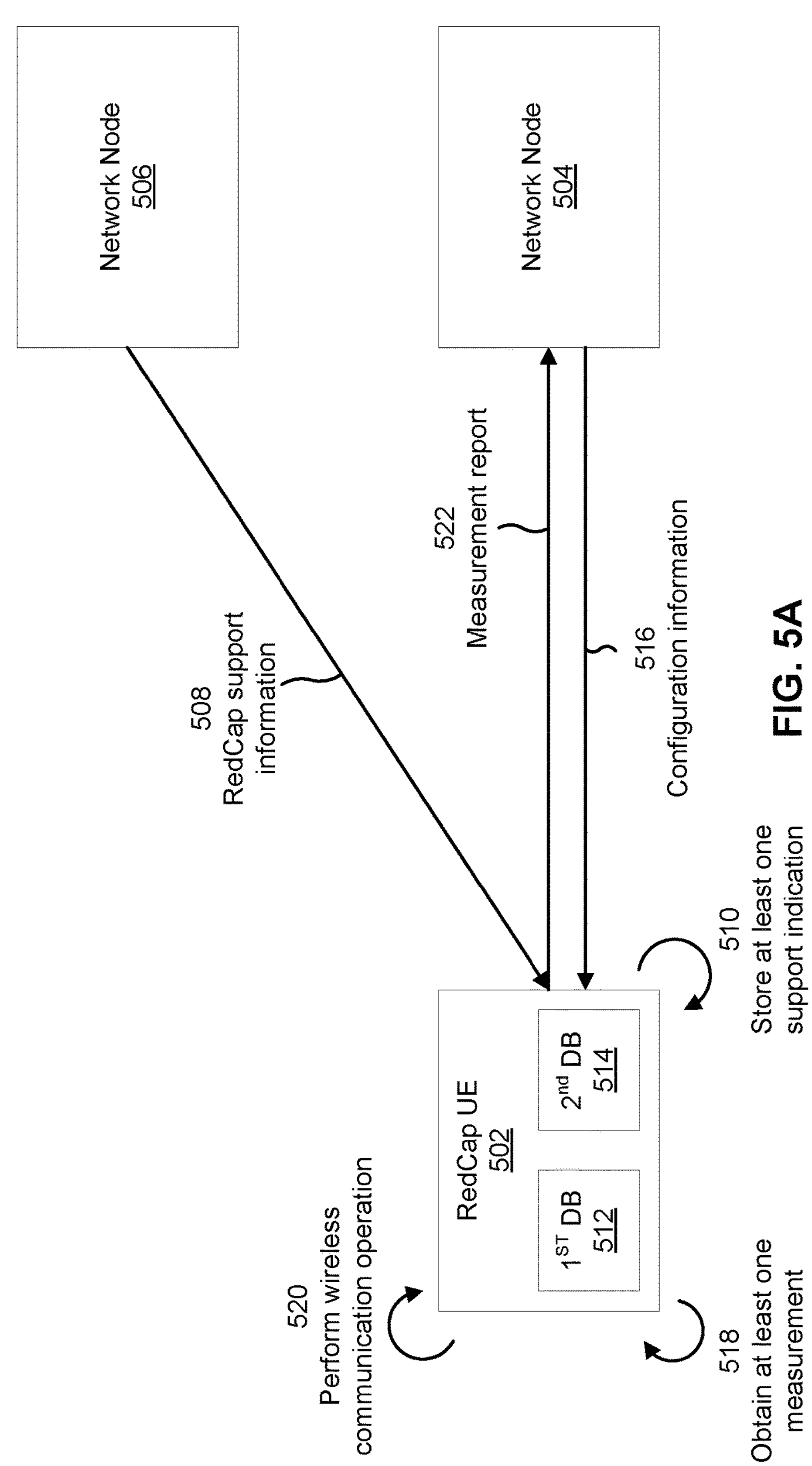
FIG. 5A is a diagram illustrating an example associated with measurement-based handover optimization for RedCap UEs, in accordance with the present disclosure.

FIG. 5A is a diagram illustrating an example 500 associated with measurement-based handover optimization for RedCap UEs, in accordance with the present disclosure. As shown in FIG. 5A, a RedCap UE 502 may communicate with a network node 504. The network node 504 may be associated with (e.g., provide) a source cell to which the RedCap UE 502 may be connected. In some aspects, the source cell may be an LTE cell. A network node 506 may be associated with a target cell. In some aspects, the target cell may be an NR cell. In some aspects, the RedCap UE 502 may be, be similar to, include, or be included in, the RedCap UE 402 depicted in FIG. 4A and/or the UE 120 depicted in FIGS. 1-3. In some aspects, the network node 504 and/or the network node 506 may be, be similar to, include, or be included in, the network node 404 and/or the network node 406 depicted in FIG. 4A, the network node 110 depicted in FIGS. 1 and 2, and/or one or more components of the base station architecture 300 depicted in FIG. 3.

As shown by reference number 508, the network node 506 may transmit, and the RedCap UE 502 may receive, RedCap support information. The RedCap support information may be associated with at least one cell associated with (e.g., provided by) the network node 506 and may indicate whether the at least one cell supports RedCap communications. In some aspects, for example, the network node 506 may transmit, and the RedCap UE 502 may receive, system information (e.g., a SIB1) that includes the RedCap support information.

As shown by reference number 510, the RedCap UE 502 may store, based on the RedCap support information, at least one RedCap support indication and/or non-RedCap support indication in a first database 512 or a second database 514, respectively. The first database 512 may include at least one RedCap support indication associated with at least one cell that indicates that the at least one cell supports RedCap communications. The second database 514 may include at least one non-RedCap support indication associated with at least one additional cell that indicates that the at least one additional cell does not support RedCap communications.

As shown by reference number 516, the network node 504 may transmit, and the RedCap UE 502 may receive, configuration information. For example, the configuration information may be associated with a measurement-based handover procedure. As shown by reference number 518, the RedCap UE 502 may obtain at least one measurement. For example, the RedCap UE 502 may obtain at least one measurement associated with a cell (including the target cell, which may have an associated cell ID) based on the configuration information. As shown by reference number 520, the RedCap UE 502 may perform a wireless communication operation. For example, the RedCap UE 502 may perform a wireless communication operation associated with the target cell based on an associated measurement satisfying a measurement condition and based on whether the cell ID is indicated in the first database 512.

As shown by reference number 522, the RedCap UE 502 may transmit, and the network node 504 may receive, a measurement report. For example, in some aspects, the RedCap UE 502 may transmit, based on the measurement satisfying the measurement condition and based on the cell ID being indicated in the first database 512, a handover measurement report that includes the measurement associated with the target cell. In some aspects, the RedCap UE 502 may transmit, based on the measurement satisfying the measurement condition and based on the cell ID being indicated in the second database 514, a handover measurement report that omits the measurement associated with the target cell.

Figure 5B:
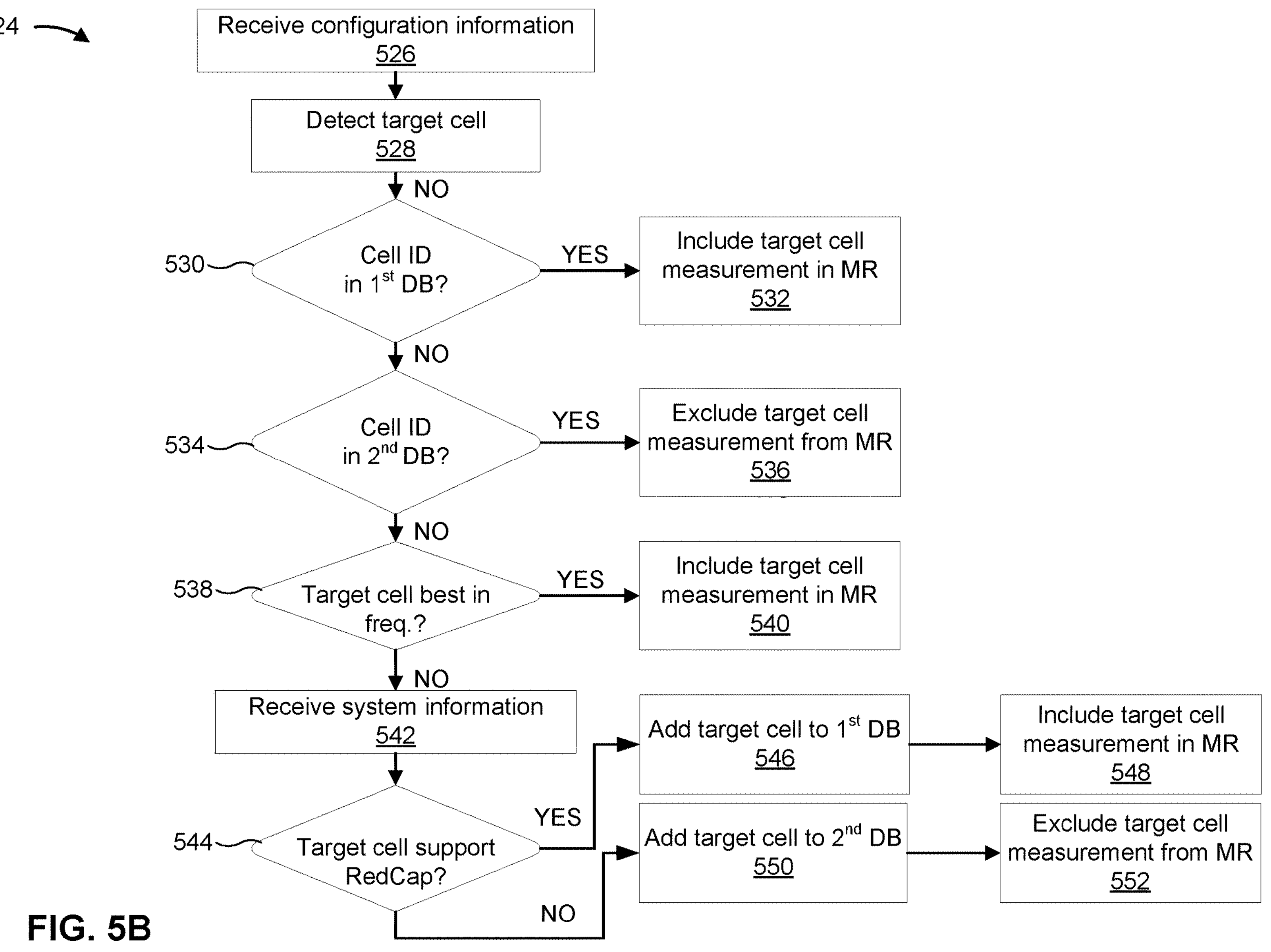
FIG. 5B is a diagram illustrating another example associated with measurement-based handover optimization for RedCap UEs, in accordance with the present disclosure.

FIG. 5B is a diagram illustrating another example 524 associated with measurement-based handover optimization for RedCap UEs, in accordance with the present disclosure. Example 524 depicts an example of a procedure that may be performed by the RedCap UE 502 in connection with the example 500 depicted in FIG. 5A.

As shown by reference number 526, the RedCap UE 502 may receive configuration information. As indicated above, in connection with FIG. 5A, the configuration information may be associated with a measurement-based handover procedure. In some aspects, the configuration information may indicate one or more frequencies on which to measure signals associated with cells. As shown by reference number 528, the RedCap UE 502 may detect the target cell and, as shown by reference number 530, may determine whether the cell ID associated with the target cell is indicated in the first database 512. If the cell ID is indicated in the first database 512, as shown by reference number 532, the RedCap UE 502 may include a measurement associated with the target cell in a measurement report.

If the cell ID is not indicated in the first database 512, as shown by reference number 534, the RedCap UE 502 may determine whether the cell ID is indicated in the second database 514. If the cell ID is indicated in the second database 514, as shown by reference number 536, the RedCap UE 502 may exclude the measurement associated with the target cell from the measurement report. If the cell ID is not indicated in the second database 514, as shown by reference number 538, the RedCap UE 502 may determine whether the target cell is the best cell associated with a frequency. A best cell associated with a frequency may be a cell, associated with that frequency, having a best associated signal quality or a highest associated signal power.

If the target cell is the best cell associated with the frequency, as shown by reference number 540, the RedCap UE 502 may include the measurement associated with the target cell in the measurement report. If the target cell is not the best cell associated with the frequency, as shown by reference number 542, the RedCap UE 502 may receive system information associated with the target cell and, as shown by reference number 544, may determine, based on the system information, whether the target cell supports RedCap UEs. If the target cell supports RedCap UEs, as shown by reference number 546, the RedCap UE 502 may add the cell ID to the first database 512 and, as shown by reference number 548, may include the measurement associated with the target cell in the measurement report. If the target cell does not support RedCap UEs, as shown by reference number 550, the RedCap UE 502 may add the cell ID to the second database 514 and, as shown by reference number 552, may exclude the measurement associated with the target cell from the measurement report.

In some aspects, if the target cell is not the best cell associated with the frequency, the RedCap UE 502 may transmit a handover measurement report that includes the measurement associated with the target cell. When the RedCap UE 502 receives a handover trigger indication associated with the target cell, the RedCap UE 502 may refrain from decoding a SIB associated with the target cell based on the target cell not being a best cell associated with the frequency.

As indicated above, FIGS. 5A and 5B are provided as examples. Other examples may differ from what is described with respect to FIGS. 5A and 5B.

Figure 6:
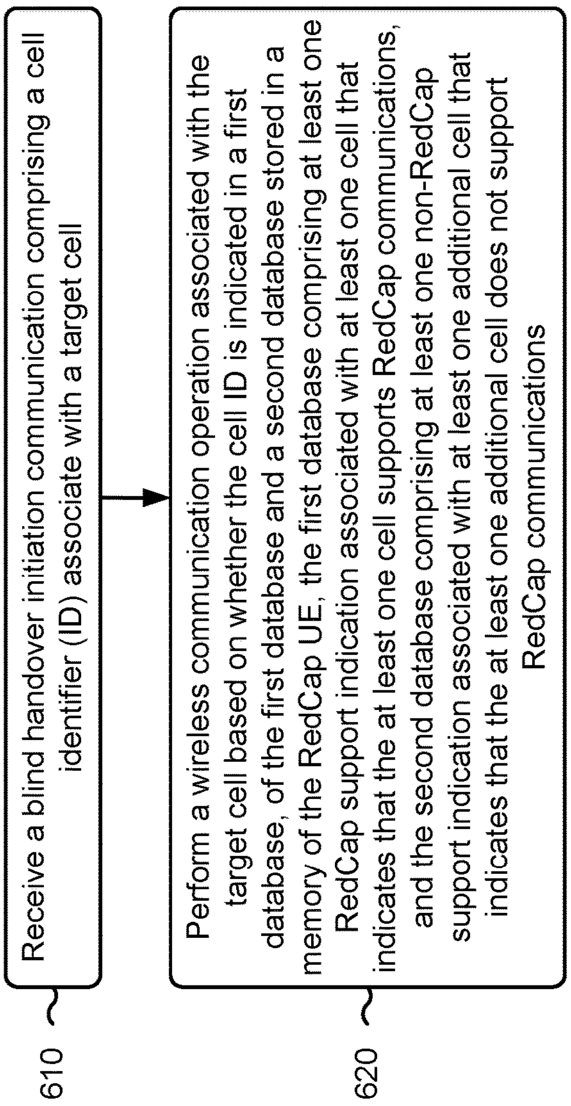
FIG. 6 is a diagram illustrating an example process performed, for example, by a RedCap UE, in accordance with the present disclosure.
Figure 6:

FIG. 6 is a diagram illustrating an example process 600 performed, for example, by a RedCap UE, in accordance with the present disclosure. Example process 600 is an example where the RedCap UE (e.g., RedCap UE 402) performs operations associated with blind handover optimization for RedCap UEs.

As shown in FIG. 6, in some aspects, process 600 may include receiving a blind handover initiation communication indicating a frequency associated with at least one cell, the at least one cell comprising a target cell having an associated a cell ID (block 610). For example, the RedCap (e.g., using communication manager 808 and/or reception component 802, depicted in FIG. 8) may receive a blind handover initiation communication indicating a frequency associated with at least one cell, the at least one cell comprising a target cell having an associated cell ID, as described above.

As further shown in FIG. 6, in some aspects, process 600 may include performing a wireless communication operation associated with the target cell based on whether the cell ID is indicated in a first database, of the first database and a second database stored in a memory of the RedCap UE, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications (block 620). For example, the RedCap (e.g., using communication manager 808, reception component 802, and/or transmission component 804, depicted in FIG. 8) may perform a wireless communication operation associated with the target cell based on whether the cell ID is indicated in a first database, of the first database and a second database stored in a memory of the RedCap UE, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications, as described above.

Process 600 may include additional aspects, such as any single aspect or any combination of aspects described below and/or in connection with one or more other processes described elsewhere herein.

In a first aspect, process 600 includes receiving RedCap support information, associated with the at least one cell, that indicates that the at least one cell supports RedCap communications, and storing, based on the RedCap support information, the at least one RedCap support indication in the first database. In a second aspect, alone or in combination with the first aspect, performing the wireless communication operation comprises initiating, based on the cell ID being indicated in the first database, a RACH handover procedure associated with the target cell. In a third aspect, alone or in combination with one or more of the first and second aspects, the cell ID is indicated in the second database, and performing the wireless communication operation comprises declaring an early radio link failure and searching for a RedCap cell.

In a fourth aspect, alone or in combination with one or more of the first through third aspects, the cell ID is not indicated in either of the first database or the second database, and performing the wireless communication operation comprises receiving system information associated with the target cell, wherein the system information includes RedCap support information, associated with the target cell, that indicates whether the target cell supports RedCap communications, and updating the first database or the second database based on the RedCap support information associated with the target cell. In a fifth aspect, alone or in combination with the fourth aspect, the RedCap support information associated with the target cell indicates that the target cell supports RedCap communications, and updating the first database or the second database comprises storing, in the first database, a RedCap support indication associated with the target cell. In a sixth aspect, alone or in combination with the fourth aspect, the RedCap support information associated with the target cell indicates that the target cell does not support RedCap communications, and updating the first database or the second database comprises storing, in the second database, a non-RedCap support indication associated with the target cell. In a seventh aspect, alone or in combination with the sixth aspect, process 600 includes searching, based on the RedCap support information associated with the target cell indicating that the target cell does not support RedCap communications, for a RedCap cell indicated by the first database.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
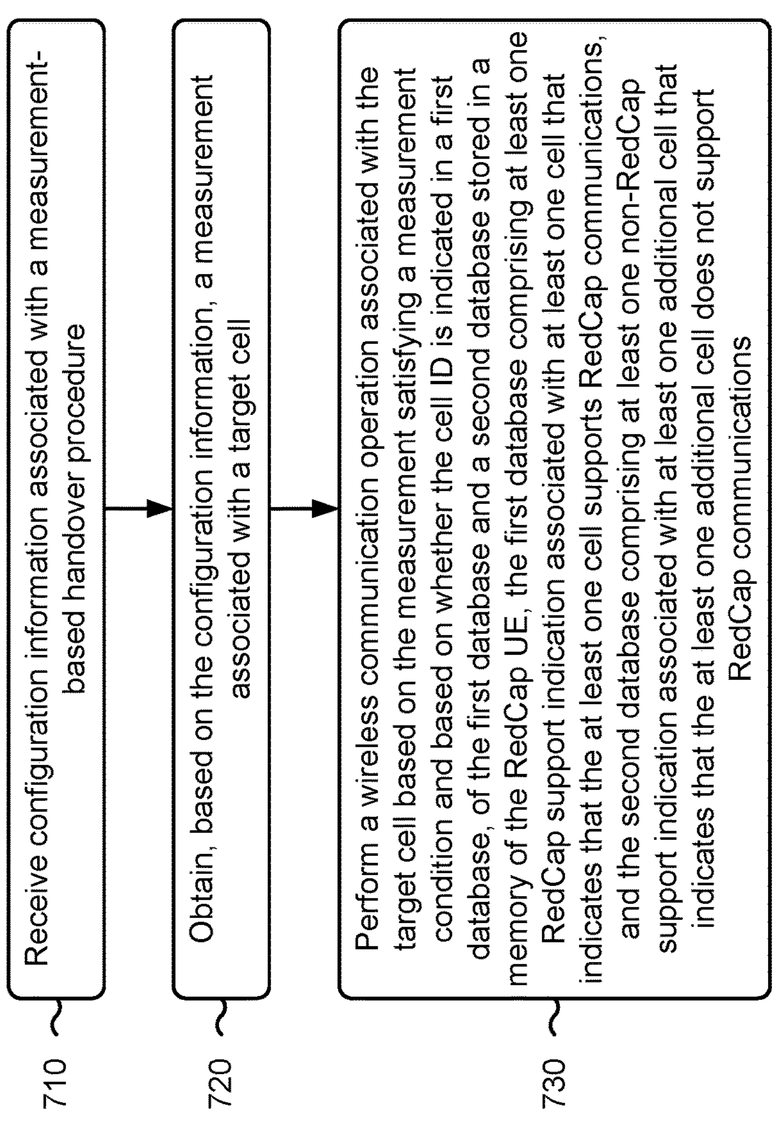
FIG. 7 is a diagram illustrating an example process performed, for example, by a RedCap UE, in accordance with the present disclosure.

FIG. 7 is a diagram illustrating an example process 700 performed, for example, by a RedCap UE, in accordance with the present disclosure. Example process 700 is an example where the RedCap UE (e.g., RedCap UE 502) performs operations associated with measurement-based handover optimization for RedCap UEs.

As shown in FIG. 7, in some aspects, process 700 may include receiving configuration information associated with a measurement-based handover procedure (block 710). For example, the RedCap UE (e.g., using communication manager 808 and/or reception component 802, depicted in FIG. 8) may receive configuration information associated with a measurement-based handover procedure, as described above.

As further shown in FIG. 7, in some aspects, process 700 may include obtaining, based on the configuration information, a measurement associated with a target cell (block 720). For example, the RedCap UE (e.g., using communication manager 808 and/or reception component 802, depicted in FIG. 8) may obtain, based on the configuration information, a measurement associated with a target cell, as described above.

As further shown in FIG. 7, in some aspects, process 700 may include performing a wireless communication operation associated with the target cell based on the measurement satisfying a measurement condition and based on whether the cell ID is indicated in a first database, of the first database and a second database stored in a memory of the RedCap UE, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications (block 730). For example, the RedCap UE (e.g., using communication manager 808, reception component 802, and/or transmission component 804, depicted in FIG. 8) may perform a wireless communication operation associated with the target cell based on the measurement satisfying a measurement condition and based on whether the cell ID is indicated in a first database, of the first database and a second database stored in a memory of the RedCap UE, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications, as described above.

Process 700 may include additional aspects, such as any single aspect or any combination of aspects described below and/or in connection with one or more other processes described elsewhere herein.

In a first aspect, process 700 includes receiving RedCap support information, associated with the at least one cell, that indicates that the at least one cell supports RedCap communications, and storing, based on the RedCap support information, the at least one RedCap support indication in the first database. In a second aspect, alone or in combination with the first aspect, process 700 includes transmitting, based on the measurement satisfying the measurement condition and based on the cell ID being indicated in the first database, a handover measurement report that includes the measurement associated with the target cell. In a third aspect, alone or in combination with the first aspect, process 700 includes transmitting, based on the measurement satisfying the measurement condition and based on the cell ID being indicated in the second database, a handover measurement report that omits the measurement associated with the target cell.

In a fourth aspect, alone or in combination with the first aspect, process 700 includes receiving, based on the measurement satisfying the measurement condition and based on the cell ID being omitted from the first database and the second database, system information associated with the target cell, the system information including RedCap support information, associated with the target cell, that indicates whether the target cell supports RedCap communications. In a fifth aspect, alone or in combination with the fourth aspect, process 700 includes transmitting a handover measurement report that omits the measurement associated with the target cell based on the target cell not supporting RedCap communications. In a sixth aspect, alone or in combination with the fourth aspect, process 700 includes transmitting a handover measurement report that includes the measurement associated with the target cell based on the target cell supporting RedCap communications.

In a seventh aspect, alone or in combination with the first aspect, process 700 includes determining that the target cell is not a best cell associated with the frequency, transmitting a handover measurement report that includes the measurement associated with the target cell, receiving a handover trigger indication associated with the target cell, wherein the target cell is associated with a frequency, and refraining from decoding a system information block associated with the target cell based on the target cell not being a best cell associated with the frequency.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
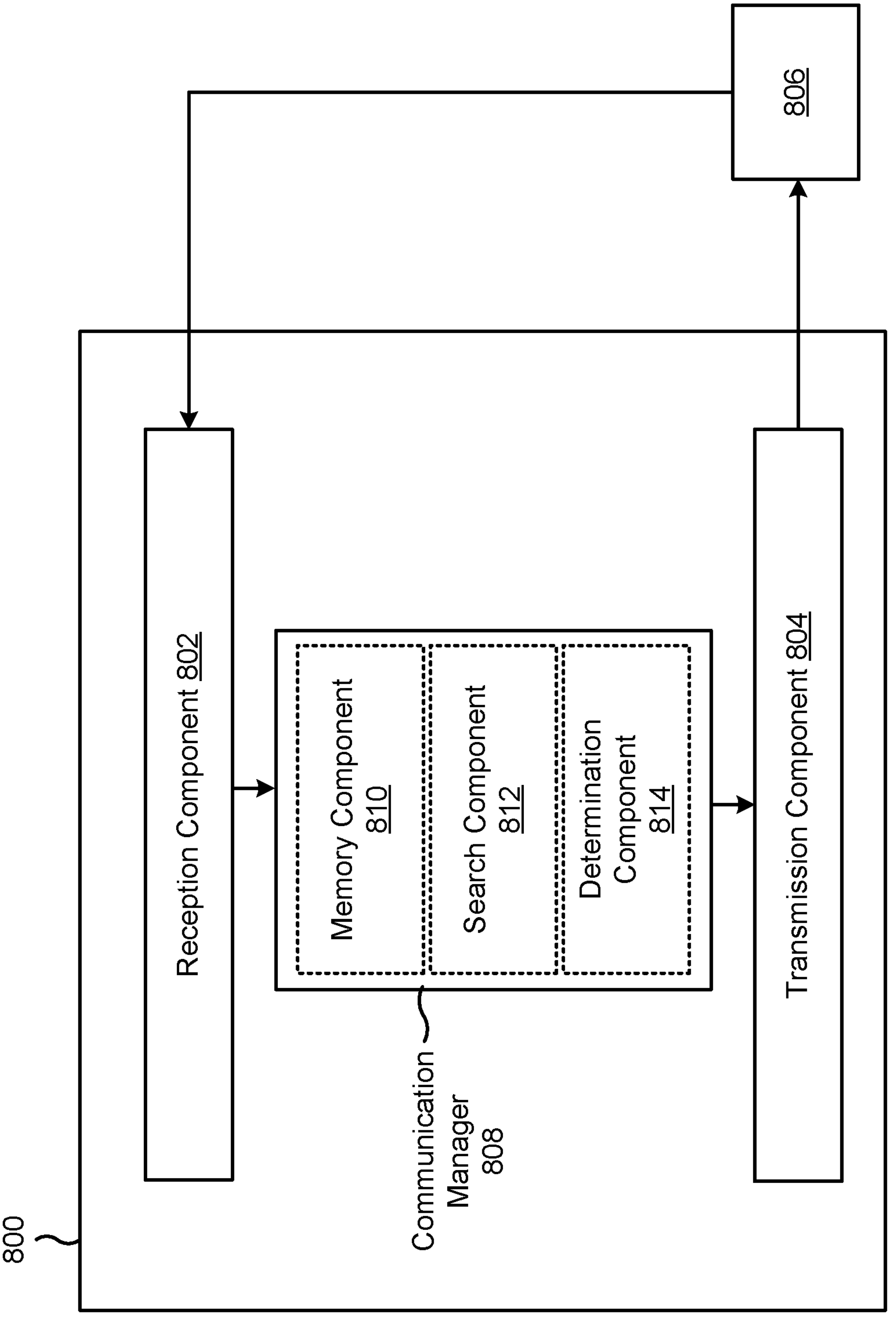
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a RedCap UE, or a RedCap UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808. The communication manager 808 may include one or more components such as a memory component 810, a search component 812, and/or a determination component 814, among other examples.

In some aspects, the apparatus 800 may be configured to perform one or more operations described herein in connection with FIGS. 4 and 5. Additionally, or alternatively, the apparatus 800 may be configured to perform one or more processes described herein, such as process 600 of FIG. 6, process 700 of FIG. 7, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

In some examples, means for transmitting, outputting, or sending (or means for outputting for transmission) may include one or more antennas, a modulator, a transmit MIMO processor, a transmit processor, or a combination thereof, of the UE described above in connection with FIG. 2.

In some examples, means for receiving (or means for obtaining) may include one or more antennas, a demodulator, a MIMO detector, a receive processor, or a combination thereof, of the UE described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for receiving, transmitting, providing, obtaining, communicating, and/or performing may include various processing system components, such as a receive processor, a transmit processor, a controller/processor, a memory, or a combination thereof, of the UE described above in connection with FIG. 2.

The communication manager 808 and/or the reception component 802 may receive a blind handover initiation communication indicating a frequency associated with at least one cell, the at least one cell comprising a target cell having an associated a cell ID. In some aspects, the communication manager 808 may include one or more antennas, a modem, a controller/processor, a memory, or a combination thereof, of the UE described in connection with FIG. 2. In some aspects, the communication manager 808 may include the reception component 802 and/or the transmission component 804. In some aspects, the communication manager 808 may be, be similar to, include, or be included in, the communication manager 140 depicted in FIGS. 1 and 2.

The communication manager 808, the reception component 802, and/or the transmission component 804 may perform a wireless communication operation associated with the target cell based on whether the cell ID is indicated in a first database, of the first database and a second database stored in the memory component 810, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications. In some aspects, the memory component 810 may include one or more of a controller/processor, a memory, or a combination thereof, of the UE described in connection with FIG. 2.

The communication manager 808 and/or the reception component 802 may receive RedCap support information, associated with the at least one cell, that indicates that the at least one cell supports RedCap communications. The communication manager 808 and/or the memory component 810 may store, based on the RedCap support information, the at least one RedCap support indication in the first database. The communication manager 808 and/or the search component 812 may search, based on the RedCap support information associated with the target cell indicating that the target cell does not support RedCap communications, for a RedCap cell indicated by the first database. In some aspects, the search component 812 may include one or more antennas, a modem, a controller/processor, a memory, or a combination thereof, of the UE described in connection with FIG. 2. In some aspects, the search component 812 may include the reception component 802 and/or the transmission component 804.

The communication manager 808 and/or the reception component 802 may receive configuration information associated with a measurement-based handover procedure. The communication manager 808 and/or the reception component 802 may obtain, based on the configuration information, a measurement associated with a target cell. The communication manager 808, the reception component 802, and/or the transmission component 804 may perform a wireless communication operation associated with the target cell based on the measurement satisfying a measurement condition and based on whether the cell ID is indicated in a first database, of the first database and a second database stored in the memory component 810, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications.

The communication manager 808 and/or the reception component 802 may receive RedCap support information, associated with the at least one cell, that indicates that the at least one cell supports RedCap communications. The communication manager 808 and/or the memory component 810 may store, based on the RedCap support information, the at least one RedCap support indication in the first database. The communication manager 808 and/or the transmission component 804 may transmit, based on the measurement satisfying the measurement condition and based on the cell ID being indicated in the first database, a handover measurement report that includes the measurement associated with the target cell. The communication manager 808 and/or the transmission component 804 may transmit, based on the measurement satisfying the measurement condition and based on the cell ID being indicated in the second database, a handover measurement report that omits the measurement associated with the target cell.

The communication manager 808 and/or the reception component 802 may receive, based on the measurement satisfying the measurement condition and based on the cell ID being omitted from the first database and the second database, system information associated with the target cell, the system information including RedCap support information, associated with the target cell, that indicates whether the target cell supports RedCap communications. The communication manager 808 and/or the transmission component 804 may transmit a handover measurement report that omits the measurement associated with the target cell based on the target cell not supporting RedCap communications. The communication manager 808 and/or the transmission component 804 may transmit a handover measurement report that includes the measurement associated with the target cell based on the target cell supporting RedCap communications.

The communication manager 808 and/or the determination component 814 may determine that the target cell is not a best cell associated with the frequency transmitting a handover measurement report that includes the measurement associated with the target cell; receiving a handover trigger indication associated with the target cell, wherein the target cell is associated with a frequency. In some aspects, the determination component 814 may include one or more antennas, a modem, a controller/processor, a memory, or a combination thereof, of the UE described in connection with FIG. 2. In some aspects, the determination component 814 may include the reception component 802 and/or the transmission component 804. The communication manager 808 and/or the reception component 802 may refrain from decoding a system information block associated with the target cell based on the target cell not being a best cell associated with the frequency.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
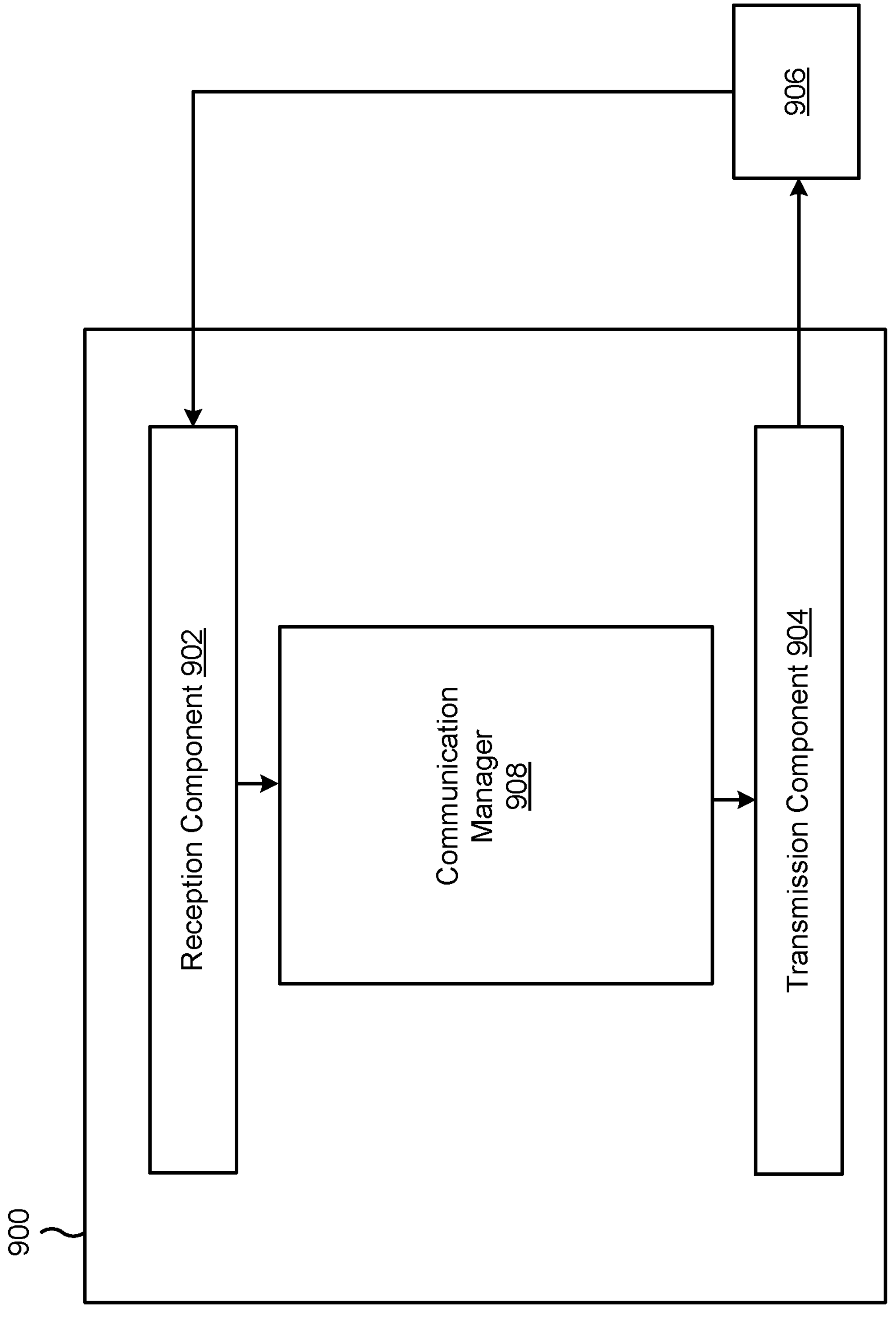
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908.

In some aspects, the apparatus 900 may be configured to perform one or more operations described herein in connection with FIGS. 4 and 5. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

In some examples, means for transmitting, outputting, or sending (or means for outputting for transmission) may include one or more antennas, a modulator, a transmit MIMO processor, a transmit processor, or a combination thereof, of the network node described above in connection with FIG. 2.

In some examples, means for receiving (or means for obtaining) may include one or more antennas, a demodulator, a MIMO detector, a receive processor, or a combination thereof, of the network node described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for transmitting, receiving, obtaining, providing, communicating, and/or performing may include various processing system components, such as a receive processor, a transmit processor, a controller/processor, a memory, or a combination thereof, of the network node described above in connection with FIG. 2.

In some aspects, the communication manager 908 may be configured to perform, manage, control, and/or otherwise facilitate any number of communication operations. In some aspects, the communication manager 908 may include one or more antennas, a modem, a controller/processor, a memory, or a combination thereof, of the network node described in connection with FIG. 2. In some aspects, the communication manager 908 may include the reception component 902 and/or the transmission component 904. In some aspects, the communication manager 908 may be, be similar to, include, or be included in, the communication manager 150 depicted in FIGS. 1 and 2.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a reduced capability (RedCap) user equipment (UE), comprising: receiving a blind handover initiation communication indicating a frequency associated with at least one cell, the at least one cell comprising a target cell having an associated cell identifier (ID); and performing a wireless communication operation associated with the target cell based on whether the cell ID is indicated in a first database, of the first database and a second database stored in a memory of the RedCap UE, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications.

Aspect 2: The method of Aspect 1, further comprising: receiving RedCap support information, associated with the at least one cell, that indicates that the at least one cell supports RedCap communications; and storing, based on the RedCap support information, the at least one RedCap support indication in the first database.

Aspect 3: The method of either of claim 1 or 2, wherein performing the wireless communication operation comprises initiating, based on the cell ID being indicated in the first database, a random access channel (RACH) handover procedure associated with the target cell.

Aspect 4: The method of either of claim 1 or 2, wherein the cell ID is indicated in the second database, and wherein performing the wireless communication operation comprises declaring an early radio link failure and searching for a RedCap cell.

Aspect 5: The method of either of claim 1 or 2, wherein the cell ID is not indicated in either of the first database or the second database, and wherein performing the wireless communication operation comprises: receiving system information associated with the target cell, wherein the system information includes RedCap support information, associated with the target cell, that indicates whether the target cell supports RedCap communications; and updating the first database or the second database based on the RedCap support information associated with the target cell.

Aspect 6: The method of Aspect 5, wherein the RedCap support information associated with the target cell indicates that the target cell supports RedCap communications, and wherein updating the first database or the second database comprises storing, in the first database, a RedCap support indication associated with the target cell.

Aspect 7: The method of Aspect 5, wherein the RedCap support information associated with the target cell indicates that the target cell does not support RedCap communications, and wherein updating the first database or the second database comprises storing, in the second database, a non-RedCap support indication associated with the target cell.

Aspect 8: The method of Aspect 7, further comprising searching, based on the RedCap support information associated with the target cell indicating that the target cell does not support RedCap communications, for a RedCap cell indicated by the first database.

Aspect 9: A method of wireless communication performed by a reduced capability (RedCap) user equipment (UE), comprising: receiving configuration information associated with a measurement-based handover procedure; obtaining, based on the configuration information, a measurement associated with a target cell; and performing a wireless communication operation associated with the target cell based on the measurement satisfying a measurement condition and based on whether the cell ID is indicated in a first database, of the first database and a second database stored in a memory of the RedCap UE, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications.

Aspect 10: The method of Aspect 9, further comprising: receiving RedCap support information, associated with the at least one cell, that indicates that the at least one cell supports RedCap communications; and storing, based on the RedCap support information, the at least one RedCap support indication in the first database.

Aspect 11: The method of either of claim 9 or 10, further comprising transmitting, based on the measurement satisfying the measurement condition and based on the cell ID being indicated in the first database, a handover measurement report that includes the measurement associated with the target cell.

Aspect 12: The method of either of claim 9 or 10, further comprising transmitting, based on the measurement satisfying the measurement condition and based on the cell ID being indicated in the second database, a handover measurement report that omits the measurement associated with the target cell.

Aspect 13: The method of either of claim 9 or 10, further comprising receiving, based on the measurement satisfying the measurement condition and based on the cell ID being omitted from the first database and the second database, system information associated with the target cell, the system information including RedCap support information, associated with the target cell, that indicates whether the target cell supports RedCap communications.

Aspect 14: The method of Aspect 13, further comprising transmitting a handover measurement report that omits the measurement associated with the target cell based on the target cell not supporting RedCap communications.

Aspect 15: The method of Aspect 13, further comprising transmitting a handover measurement report that includes the measurement associated with the target cell based on the target cell supporting RedCap communications.

Aspect 16: The method of either of claim 9 or 10, further comprising: determining that the target cell is not a best cell associated with the frequency; transmitting a handover measurement report that includes the measurement associated with the target cell; receiving a handover trigger indication associated with the target cell, wherein the target cell is associated with a frequency; and refraining from decoding a system information block associated with the target cell based on the target cell not being a best cell associated with the frequency.

Aspect 17: An apparatus for wireless communication at a device, comprising a processor; memory coupled with the processor; and instructions stored in the memory and executable by the processor to cause the apparatus to perform the method of one or more of Aspects 1-8.

Aspect 18: A device for wireless communication, comprising a memory and one or more processors coupled to the memory, the memory comprising instructions for the one or more processors to cause the device to perform the method of one or more of Aspects 1-8.

Aspect 19: A device for wireless communication, comprising a memory and one or more processors coupled to the memory, the one or more processors configured to perform the method of one or more of Aspects 1-8.

Aspect 20: An apparatus for wireless communication, comprising at least one means for performing the method of one or more of Aspects 1-8.

Aspect 21: A non-transitory computer-readable medium storing code for wireless communication, the code comprising instructions executable by a processor to perform the method of one or more of Aspects 1-8.

Aspect 22: A non-transitory computer-readable medium storing a set of instructions for wireless communication, the set of instructions comprising one or more instructions that, when executed by one or more processors of a device, cause the device to perform the method of one or more of Aspects 1-8.

Aspect 23: An apparatus for wireless communication at a device, comprising a processor; memory coupled with the processor; and instructions stored in the memory and executable by the processor to cause the apparatus to perform the method of one or more of Aspects 9-16.

Aspect 24: A device for wireless communication, comprising a memory and one or more processors coupled to the memory, the memory comprising instructions for the one or more processors to cause the device to perform the method of one or more of Aspects 9-16.

Aspect 25: A device for wireless communication, comprising a memory and one or more processors coupled to the memory, the one or more processors configured to perform the method of one or more of Aspects 9-16.

Aspect 26: An apparatus for wireless communication, comprising at least one means for performing the method of one or more of Aspects 9-16.

Aspect 27: A non-transitory computer-readable medium storing code for wireless communication, the code comprising instructions executable by a processor to perform the method of one or more of Aspects 9-16.

Aspect 28: A non-transitory computer-readable medium storing a set of instructions for wireless communication, the set of instructions comprising one or more instructions that, when executed by one or more processors of a device, cause the device to perform the method of one or more of Aspects 9-16.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A reduced capability (RedCap) user equipment (UE) for wireless communication, comprising:

a memory; and one or more processors coupled to the memory, the memory comprising instructions executable by the one or more processors to cause the RedCap UE to:

receive, from a network node, configuration information associated with a measurement-based handover procedure;

obtain, based on the configuration information, a measurement associated with a target cell; and transmit, to the network node, a handover measurement report that omits the measurement associated with the target cell based on the measurement satisfying a measurement condition and based on whether a cell identifier (ID) associated with the target cell is indicated in a second database, of a first database and the second database stored in the memory, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications.

2. The RedCap UE of claim 1, wherein the memory further comprises instructions executable by the one or more processors to cause the RedCap UE to:

receive, from the target cell, RedCap support information, associated with the at least one cell, that indicates that the at least one cell supports RedCap communications; and store, based on the RedCap support information, the at least one RedCap support indication in the first database.

3. The RedCap UE of claim 1, wherein the memory further comprises instructions executable by the one or more processors to cause the RedCap UE to:

transmit, to the network node, based on the measurement satisfying the measurement condition and based on the cell ID being indicated in the first database, a handover measurement report that includes the measurement associated with the target cell.

4. The RedCap UE of claim 1, wherein the memory further comprises instructions executable by the one or more processors to cause the RedCap UE to:

receive, from the target cell, based on the measurement satisfying the measurement condition and based on the cell ID being omitted from the first database and the second database, system information associated with the target cell, the system information including RedCap support information, associated with the target cell, that indicates whether the target cell supports RedCap communications.

5. The RedCap UE of claim 4, wherein the memory further comprises instructions executable by the one or more processors to;

cause the RedCap UE to transmit, to the network node, a handover measurement report that omits the measurement associated with the target cell based on the target cell not supporting RedCap communications.

6. The RedCap UE of claim 4, wherein the memory further comprises instructions executable by the one or more processors to:

cause the RedCap UE to transmit, to the network node, a handover measurement report that includes the measurement associated with the target cell based on the target cell supporting RedCap communications.

7. The RedCap UE of claim 1, wherein the memory further comprises instructions executable by the one or more processors to cause the RedCap UE to:

determine that the target cell is not a best cell associated with a frequency;

transmit, to the network node, a handover measurement report that includes the measurement associated with the target cell;

receive a handover trigger indication associated with the target cell, wherein the target cell is associated with a frequency; and refrain from decoding a system information block associated with the target cell based on the target cell not being a best cell associated with the frequency.

8. The RedCap UE of claim 1, wherein the memory further comprises instructions executable by the one or more processors to cause the RedCap UE to perform a wireless communication operation associated with the target cell based on the measurement satisfying the measurement condition and based on the cell ID being indicated in the first database.

9. A method of wireless communication performed by a reduced capability (RedCap) user equipment (UE), comprising:

receiving, from a network node, configuration information associated with a measurement-based handover procedure;

obtaining, based on the configuration information, a measurement associated with a target cell; and transmitting, to the network node, a handover measurement report that omits the measurement associated with the target cell based on the measurement satisfying a measurement condition and based on whether a cell identifier (ID) associated with the target cell is indicated in a second database, of a first database and the second database stored in a memory of the RedCap UE, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications.

10. The method of claim 9, further comprising:

receiving, from the target cell, RedCap support information, associated with the at least one cell, that indicates that the at least one cell supports RedCap communications; and storing, based on the RedCap support information, the at least one RedCap support indication in the first database.

11. The method of claim 9, further comprising:

transmitting, to the network node, based on the measurement satisfying the measurement condition and based on the cell ID being indicated in the first database, a handover measurement report that includes the measurement associated with the target cell.

12. The method of claim 9, further comprising:

receiving, from the target cell, based on the measurement satisfying the measurement condition and based on the cell ID being omitted from the first database and the second database, system information associated with the target cell, the system information including RedCap support information, associated with the target cell, that indicates whether the target cell supports RedCap communications.

13. The method of claim 12, further comprising:

transmitting, to the network node, a handover measurement report that omits the measurement associated with the target cell based on the target cell not supporting RedCap communications.

14. The method of claim 12, further comprising:

transmitting, to the network node, a handover measurement report that includes the measurement associated with the target cell based on the target cell supporting RedCap communications.

15. The method of claim 9, further comprising:

determining that the target cell is not a best cell associated with a frequency;

transmitting, to the network node, a handover measurement report that includes the measurement associated with the target cell;

receiving a handover trigger indication associated with the target cell, wherein the target cell is associated with a frequency; and refraining from decoding a system information block associated with the target cell based on the target cell not being a best cell associated with the frequency.

16. The method of claim 9, further comprising:

performing a wireless communication operation associated with the target cell based on the measurement satisfying the measurement condition and based on the cell ID being indicated in the first database.

17. A non-transitory computer-readable medium storing a set of instructions for wireless communication, the set of instructions comprising:

one or more instructions that, when executed by one or more processors of a reduced capability (RedCap) user equipment (UE), cause the RedCap UE to:

receive, from a network node, configuration information associated with a measurement-based handover procedure;

obtain, based on the configuration information, a measurement associated with a target cell; and transmit, to the network node, a handover measurement report that omits the measurement associated with the target cell based on the measurement satisfying a measurement condition and based on whether a cell identifier (ID) associated with the target cell is indicated in a second database, of a first database and the second database stored in a memory of the RedCap UE, the first database comprising RedCap-supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications.

18. The non-transitory computer-readable medium of claim 17, wherein the one or more instructions cause the RedCap UE to:

receive, from the target cell, RedCap support information, associated with the at least one cell, that indicates that the at least one cell supports RedCap communications; and store, based on the RedCap support information, the at least one RedCap support indication in the first database.

19. The non-transitory computer-readable medium of claim 17, wherein the one or more instructions cause the RedCap UE to:

transmit, to the network node, based on the measurement satisfying the measurement condition and based on the cell ID being indicated in the first database, a handover measurement report that includes the measurement associated with the target cell.

20. The non-transitory computer-readable medium of claim 17, wherein the one or more instructions cause the RedCap UE to:

receive, from the target cell, based on the measurement satisfying the measurement condition and based on the cell ID being omitted from the first database and the second database, system information associated with the target cell, the system information including RedCap support information, associated with the target cell, that indicates whether the target cell supports RedCap communications.

21. The non-transitory computer-readable medium of claim 20, wherein the one or more instructions cause the RedCap UE to:

transmit, to the network node, a handover measurement report that omits the measurement associated with the target cell based on the target cell not supporting RedCap communications.

22. The non-transitory computer-readable medium of claim 20, wherein the one or more instructions cause the RedCap UE to:

transmit, to the network node, a handover measurement report that includes the measurement associated with the target cell based on the target cell supporting RedCap communications.

23. The non-transitory computer-readable medium of claim 17, wherein the one or more instructions cause the RedCap UE to:

determine that the target cell is not a best cell associated with a frequency;

transmit, to the network node, a handover measurement report that includes the measurement associated with the target cell;

receive a handover trigger indication associated with the target cell, wherein the target cell is associated with a frequency; and refrain from decoding a system information block associated with the target cell based on the target cell not being a best cell associated with the frequency.

24. The non-transitory computer-readable medium of claim 17, wherein the one or more instructions cause the RedCap UE to:

perform a wireless communication operation associated with the target cell based on the measurement satisfying the measurement condition and based on the cell ID being indicated in the first database.

25. An apparatus for wireless communication, comprising:

means for receiving, from a network node, configuration information associated with a measurement-based handover procedure;

means for obtaining, based on the configuration information, a measurement associated with a target cell; and means for transmitting, to the network node, a handover measurement report that omits the measurement associated with the target cell based on the measurement satisfying a measurement condition and based on whether a cell identifier (ID) associated with the target cell is indicated in a second database, of a first database and the second database stored in a memory of the apparatus, the first database comprising reduced capability (RedCap) supporting cell information that includes at least one RedCap support indication associated with at least one cell that indicates that the at least one cell supports RedCap communications, and the second database comprising non-RedCap-supporting cell information that includes at least one non-RedCap support indication associated with at least one additional cell that indicates that the at least one additional cell does not support RedCap communications.

26. The apparatus of claim 25, further comprising:

means for receiving, from the target cell, RedCap support information, associated with the at least one cell, that indicates that the at least one cell supports RedCap communications; and means for storing, based on the RedCap support information, the at least one RedCap support indication in the first database.

27. The apparatus of claim 25, further comprising:

means for transmitting, to the network node, based on the measurement satisfying the measurement condition and based on the cell ID being indicated in the first database, a handover measurement report that includes the measurement associated with the target cell.

28. The apparatus of claim 25, further comprising:

means for receiving, from the target cell, based on the measurement satisfying the measurement condition and based on the cell ID being omitted from the first database and the second database, system information associated with the target cell, the system information including RedCap support information, associated with the target cell, that indicates whether the target cell supports RedCap communications.

29. The apparatus of claim 28, further comprising:

means for transmitting, to the network node, a handover measurement report that includes the measurement associated with the target cell based on the target cell supporting RedCap communications.

30. The apparatus of claim 25, further comprising:

means for performing a wireless communication operation associated with the target cell based on the measurement satisfying the measurement condition and based on the cell ID being indicated in the first database.

* * * * *